US006597679B1

United States Patent
Willars (10) Patent No.: US 6,597,679 B1
(45) Date of Patent: Jul. 22, 2003

(54) CONTROL OF COMPRESSED MODE TRANSMISSION IN WCDMA

(75) Inventor: Per Willars, Stockholm (SE)

(73) Assignee: Telefonaktiebolat LM Ericsson, Stockholm (SE)

( * ) Notice: Subject to any disclaimer, the term of this patent is extended or adjusted under 35 U.S.C. 154(b) by 0 days.

(21) Appl. No.: 09/451,846

(22) Filed: Dec. 1, 1999

(51) Int. Cl.[7] ............................................. H04B 7/216
(52) U.S. Cl. ..................... 370/342; 370/335; 455/436; 455/434; 455/442
(58) Field of Search ................................. 370/310, 328, 370/331, 329, 332, 342, 335; 455/436, 437, 439, 442, 434, 444, 67.1, 553, 550

(56) References Cited

U.S. PATENT DOCUMENTS

| | | | | |
|---|---|---|---|---|
| 5,175,867 A | * | 12/1992 | Wejke et al. | 455/331 |
| 5,533,014 A | * | 7/1996 | Willars et al. | 370/206 |
| 5,828,659 A | * | 10/1998 | Teder et al. | 370/328 |
| 5,896,368 A | * | 4/1999 | Dahlman et al. | 370/335 |
| 6,011,974 A | * | 1/2000 | Cedervall et al. | 455/456 |
| 6,122,270 A | * | 9/2000 | Whinnett et al. | 370/342 |
| 6,144,861 A | * | 11/2000 | Sundelin et al. | 455/522 |

OTHER PUBLICATIONS

Gustafsson et al., "Compressed Mode Techniques For Inter–Frequency Measurements In A Wide–Band DS–CDMA System," (XP–002127494), Waves of the Year 200+ PIMRC. The IEEE International Symposium on Personal Indoor and Mobile Radio Communications, Technical Program, vol. 1, Sep. 1997, pp. 231–235.

* cited by examiner

Primary Examiner—Edward F. Urban
Assistant Examiner—Tilahun Gesesse
(74) Attorney, Agent, or Firm—Nixon & Vanderhye P.C.

(57) ABSTRACT

A telecommunications system employing WCDMA technology in a preferred embodiment, utilizes compressed mode techniques to allow a mobile station to take measurements on another frequency in preparation for inter-frequency transfer. The current assumption is that the compressed mode characteristics are controlled by the network, but such control leads to problems when one considers that the slot characteristics are very dependent upon the mobile station characteristics. In the present invention, the control of the slot specifications are dictated by the mobile station to the network and acknowledged by the network to the mobile station. Thereafter, the network informs the WCDMA base station of the slot specifications, which are then imposed from the CDMA base station to the mobile station. Once the mobile station receives the slot from the WCDMA base station, the mobile station is confident that the slot will conform with the characteristics that the mobile station needs in order to make the appropriate measurements.

19 Claims, 7 Drawing Sheets

CONTROL OF COMPRESSED MODE TRANSMISSION IN WCDMA

FIELD OF THE INVENTION

The present invention pertains to cellular telecommunications, and particularly to compressed mode (e.g., also known as slotted mode) control in a WCDMA mobile radio system.

BACKGROUND AND SUMMARY OF THE INVENTION

In mobile telecommunications, a mobile station (MS) such as a mobile telephone communicates over radio channels with base stations. Each base station usually transmits and receives signals over selected radio channels for a particular geographic region known as a cell. The cell often is subdivided into several sectors. Typically a plurality of base stations are connected to a base station controller node, also known as an exchange or a radio network controller node (RNC). One or more RNCs are, in turn, connected to or included with a mobile switching center (MSC). The mobile switching center is usually connected, e.g., via a gateway, to other telecommunication networks, such as the public switched telephone network or to a packet-data network such as the Internet.

In a code division multiple access (CDMA) mobile telecommunications system, the information transmitted between a base station and a particular mobile station is modulated by a mathematical code (such as spreading code) to distinguish it from information for other mobile stations which are utilizing the same radio frequency. Thus, in CDMA each mobile radio employs its own unique code sequence to encode its data signal. The receiver, knowing the code sequences of the mobile radio it services, decodes the received signal to recover data from each radio.

The CDMA encoding process enlarges the spectrum of the signal and is therefore known as spread-spectrum modulation. The resulting signal is also called a spread-spectrum signal, and CDMA is often denoted as spread-spectrum multiple access. The spectral spreading of the transmitted signal gives to CDMA its multiple access capability. That is, if multiple radios transmit a spread-spectrum signal at the same time, the receiving station will still be able to distinguish between the radios because each user has a unique code that has a sufficiently low cross-correlation with other codes used simultaneously by other radios.

Correlating the received signal with a code signal from a certain radio despreads the signal from that radio, while the other spread-spectrum signals will remain spread over a large bandwidth. Thus, after decoding a signal from a particular radio within the information bandwidth, the power of the desired radio signal will be larger than the interfering power of the other radios. With that power discrepancy, the desired signal can be extracted.

In a CDMA system, power control is very important. In the uplink direction, the requirement for power control arises because of the possibility for multiple access interference. All radios in a cell using a CDMA system transmit their data using the same bandwidth at the same time as other radios in that cell. Further, in a CDMA system the neighboring cell frequencies are the same as in a given cell. So interference can be seen into neighboring cells, causing capacity degradation. In such a system, it is inevitable that radios will interfere with one another. Signals received by the base station from a radio close to the base stations, for example, will be stronger than signals received from radios located at a cell boundary. Distant radios will thus tend to be dominated by close ones. To maintain capacity, all signals, regardless of distance, arrive at the base station with the same mean power by controlling the radios to achieve a constant received mean power for each user.

In contrast to the uplink, in the downlink, all signals from a base station propagate through the same channel and thus are received by a mobile station with equal power. Power control on the downlink is not required to eliminate the near-far problem, but is required to minimize or offset interference with neighboring cells.

These power controls require certain measurements of signal strength, signal loss characteristics, etc. to be taken. In some cases, the mobile radio participates in obtaining those measurements.

The mobile radio measurements are also be used to evaluate soft, softer and hard handovers. In soft handover a mobile station is connected to more than one base station simultaneously. Softer handover is a soft handover between two sectors of a cell. A mobile station performs a hard handover when the signal strength of a neighboring cell exceeds the signal strength of the current cell within a given threshold.

In order to avoid the various forms of interference, instantaneous handovers occur between cells, sectors, and base stations as needed when the signal strength after the change would exceed the signal strength of the current conditions and to allow the mobile station to connect into a cell from which it receives a signal with the highest power (i.e., with the lowest path loss). For example, a mobile station may enter a soft handover when the signal strength of neighboring cell exceeds a certain threshold but is still below the current base station's signal strength.

Further, mobile station comparative measurements are taken to optimize a mobile radio's transmissions when multiple frequency carriers exist in a cell. This exists, as an example, in hierarchical cell structures where micro cells will have a different frequency than the macro cell overlaying the micro cell. For those inter-frequency handovers, the mobile station has to be able to measure the signal strength and quality of another carrier frequency, while still maintaining the connection in the current carrier frequency. Since a CDMA transmission is continuous, there are ordinarily no idle slots for the inter-frequency measurement to occur.

Two proposals are presented to address the mobile radio's need to measure on one channel while continuously receiving on another channel, namely: 1) the so-called compressed mode and 2) the use of a dual receiver mode. In the compressed mode, measurement slots are created by transmitting the data of a frame, for example, with a lower spreading ratio during a shorter period, and the rest of the frame is utilized for the measurements on other carrier frequencies. In the second alternative, mobile stations are equipped with dual receive mode capability so they can receive on two channels simultaneously. The dual receiver can measure other frequencies without affecting the reception of the current frequency.

In CDMA mobile communications, typically the same base band signal with suitable spreading is sent from several base stations with overlapping coverage. The mobile terminal can thus receive and use signals from several base stations simultaneously. Moreover, since the radio environment changes rapidly, a mobile station likely has radio channels to several base stations at the same moment, e.g., so that the mobile station can select the best channel and, if necessary, use signals directed to the mobile from various base stations in order to keep radio interference low and capacity high.

One weakness of conventional cellular telecommunications networks is narrowband radio access. Newer radio access systems provide wireless access at very high data rates and support enhanced bearer services not realistically attainable with earlier generation mobile communication systems. One such system is the Wideband-Code Division Multiple Access (W-CDMA) radio access network. Unlike narrowband access methods such as Frequency Division Multiple Access (FDMA) and Time Division Multiple Access (TDMA), and to some extent "regular" CDMA, W-CDMA supports greater bandwidths and improves the quality of service by providing robust operation in fading environments and transparent handoffs between base stations.

A universal mobile telecommunications system (UMTS) that provides communications with mobile radios, including multimedia communications, utilizing a UMTS Radio Access Network (URAN), is disclosed in U.S. Provisional Patent Application Serial No. 60/080,548 for "Radio Access in Universal Mobile Telephone System, filed Apr. 3, 1998, which is incorporated herein by reference. The URAN includes plural base stations for communicating with mobile radios over a radio air interface using radio channel resources allocated by a radio network controller connected to the base stations. First and second external network service nodes that interface with first and second external networks, respectively, communicate with the URAN over a radio access network interface. The URAN provides a radio access bearer service to the service nodes. When one of the service nodes requires communication with a mobile radio, the service node requests a radio access bearer from the URAN rather than a specific radio channel resource. A radio access bearer is a logical channel through the URAN and over the radio air interface corresponding to a single data stream. For example, one bearer "carries" a speech connection, another bearer carries a video connection, and a third bearer carries a data packet connection. Bearers are logical channels mapped onto physical channels. The radio access bearers are dynamically assigned to radio channel resources solely by the URAN. The radio access bearer service and the radio access network (RAN) interface isolate the details of radio resource handling, radio channel allocation, and radio control, e.g., soft handoff, which are managed by the URAN from services requested and managed by the service nodes, e.g., call control and supplementary service requests, authentication, mobility management, etc.

In WCDMA, interfrequency handovers used in hierarchical, macro, and micro cells require the taking of measurements on other frequencies while maintaining a continuous connection on a current frequency. Such handovers can also occur between a WCDMA system and a second-generation system, like GSM or IS-95. In order to complete interfrequency handovers, measurements on other frequencies than the current frequency can be taken care of by either the dual receiver mode or compressed mode proposals.

That is, if the mobile radio has dual receiver mode capability, during the interfrequency measurements, one receiver branch is switched to another frequency for measurements, while the other keeps receiving the WCDMA data stream from the current frequency. The advantage of the dual receiver mode approach is that there is no break in the current frequency connection.

In the compressed mode approach, the mobile station is given spare time to measure other WCDMA frequencies (or a second generation frequency). Ordinarily, compressed mode exists only on the downlink or simultaneously on the downlink and uplink (if the current transmission disturbs the measurement taken on another frequency, for example, measuring PCS1900 when in WCDMA mode).

The current state of the art has the compressed mode operation being controlled by the network (UTRAN). Under that system, when the UTRAN requests a mobile to deliver measurements on another frequency, it also defines the slot and defines when the mobile can enter compressed mode. This can be done as defining a periodic compressed mode, e.g., every N frames starting frame M, or a single compressed mode frame, e.g., frame M.

The current system has problematic consequences associated with the fact that a network can expect to encounter different mobile station implementations, each of which may require different amounts of compressed mode to perform inter-frequency measurements. Further, the network must recognize when a particular mobile station has a dual receiver mode, since, in that case, no slot is required at all—but that is pre-conditioned on the mobile station at issue being equipped with an extra receiver. The specific and varied mobile station types thus remains at issue in deciding whether compressed mode is necessary; and if so, how much slot is necessary. Further, some mobile stations may require compressed mode both on uplink and downlink, depending on what is to be measured. Others will require it only on downlink.

The requirements for compressed mode will also differ depending on what is to be measured by the mobile station. The slot may be different when the mobile station is measuring another WCDMA frequency, another WCDMA frequency in another (future defined) band, a TDD frequency in the UMTS band, a PCS1900 frequency, a DCS 1800 frequency, a GSM 900 frequency, a PDC 1500 frequency, etc. Thus, there will be many different types of dual receiver mode implementations of (WCDMA+another system).

When the network controls the compressed mode for these terminals, it has to either order compressed mode unnecessarily often (for terminals not requiring frequent compressed mode), or it has to take the different terminal capabilities into account. As seen from the examples above, the description of the capabilities of the terminals may become very complex, such that the information needed by the network to control the compressed mode is inefficiently large.

In the present solution to the above problems, the compressed mode is controlled by the mobile. In an example implementation, the mobile will make a request to the UTRAN to enter compressed mode (or change an existing compressed mode scheme) in a particular frame and the UTRAN will respond to acknowledge this. The specifics for entering compressed mode may still be defined as a single-frame compressed mode or as a periodic compressed mode scheme.

These, as well as other objects and advantages of this invention, will be more completely understood and appreciated by careful study of the following more detailed description of a presently preferred exemplary embodiment of the invention taken in conjunction with the accompanying drawings, of which:

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
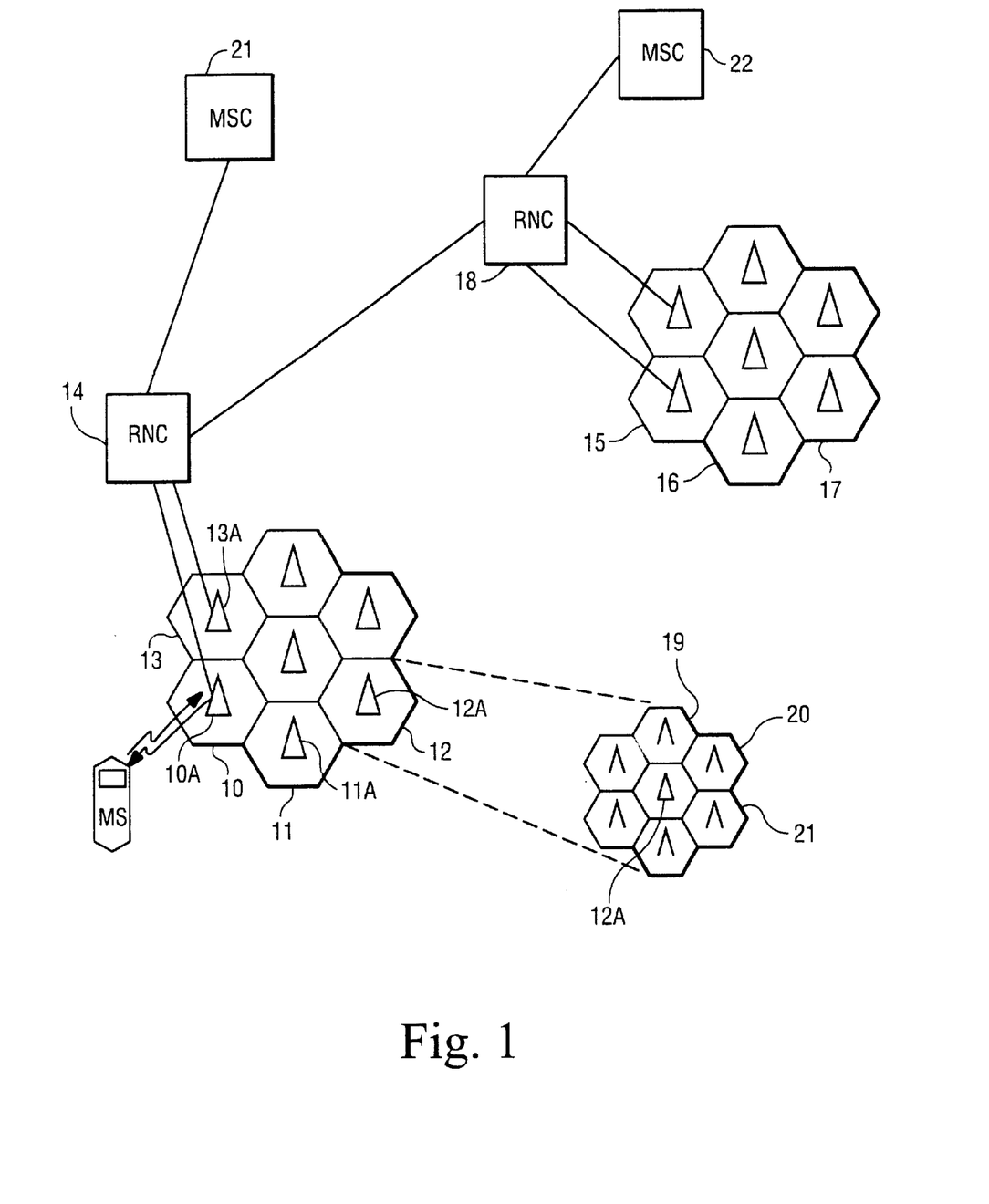
FIG. 1 is simplified schematic view of a cellular system into which the present invention may be incorporated.

FIG. 1 illustrates a typical cellular telephone system (in simplified part) in which the present invention may find application. In FIG. 1, the mobile station MS communicates via base station 10A within a geographic cell location 10 as the mobile station MS travels within the cell 10. Geographic areas are defined by further cells 11, 12, 13, etc., each serviced by respective base stations 11A, 12A, 13A, etc. The base stations 10A–13A communicate with a radio network core RNC 14, which may communicate with other radio network cores 18 and mobile services switching centers 21. A geographic area will be defined by multiple groups of cells serviced by different radio network cores 14 and 18. Thus, additional cells 15, 16, 17, etc. will be serviced by a different radio network core 18, which in turn is serviced by another mobile services switching center 22.

Even within particular cells 12, the geographic region may be further sub-divided into so-called sectors 19, 20, 21, etc. Thus, base station 12A may employ directional antennas to define certain sectors within the cell 12 in order to define the various sectors 19–21.

As the mobile station MS roams from cell to cell, the mobile station communications will be handed over from one base station to another, for example from base station 10A to base station 11A. As this occurs, the radio network core 14 supervises the handover operation, which is conducted upon initiation of, for example, measurements taken by the mobile station MS and/or the base stations 10A, 11A, 12A, etc. Once the measurements are taken, a determination is made as to whether the mobile station would be better serviced under the current conditions by a different base station.

Figure 2:
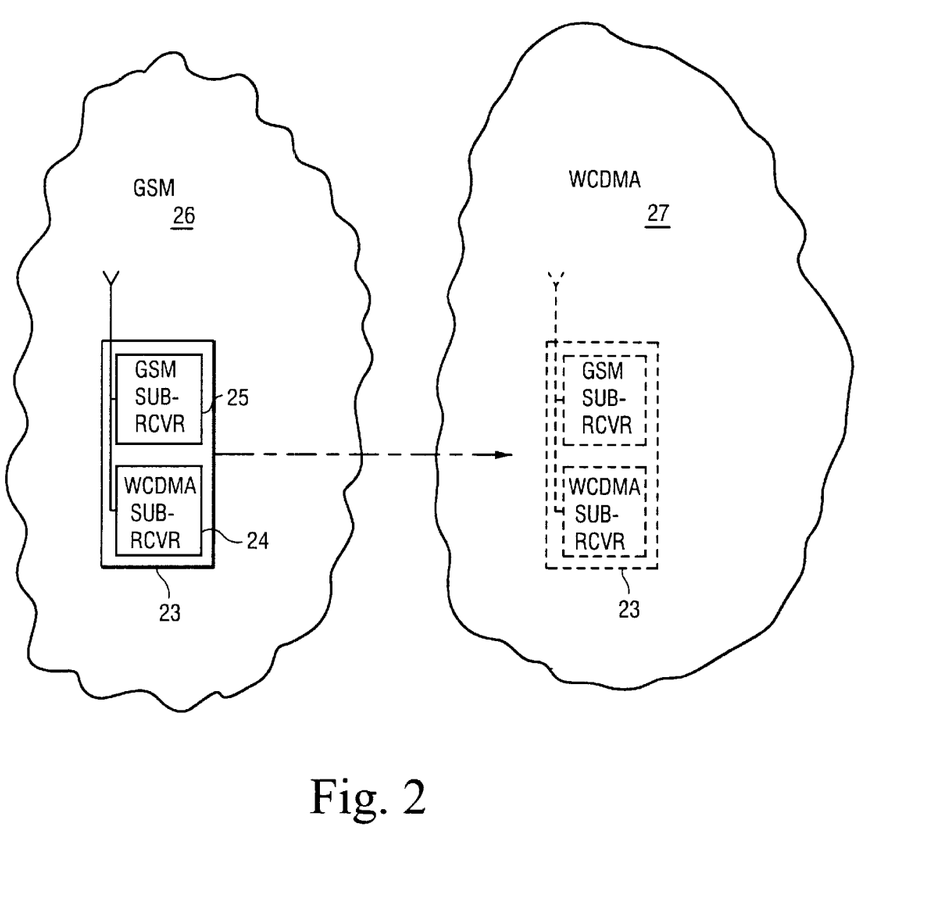
FIG. 2 is a simplified schematic view of a dual receiver mode mobile radio.

It is not uncommon for mobile stations to roam outside of a cellular service area into a new cellular service area which is accommodated by a wholly different cellular communications scheme. In FIG. 2, mobile station 23 is shown communicating within a second generation GSM network 26. Thereafter, the mobile station moves, as shown by the dotted line, to a geographic area serviced by a third generation WCDMA network 27. In the particular embodiment shown in FIG. 2, the mobile station 23 has a so-called dual receiver mode, which are designed particularly to address the problems associated with using mobile stations in both second generation and third generation serviced geographic areas. In the second generation GSM network 26, the mobile station 23 employs the GSM sub-receiver 25 to receive communications. After the mobile station 23 moves into the third generation WCDMA network 27, it employs its alternative WCDMA sub-receiver system 24. The dual receiver mode capability of the mobile station 23 is not present in all mobile stations and is an optional feature, which will have relevance to one example aspect of the present invention as described further herein.

Figure 3:
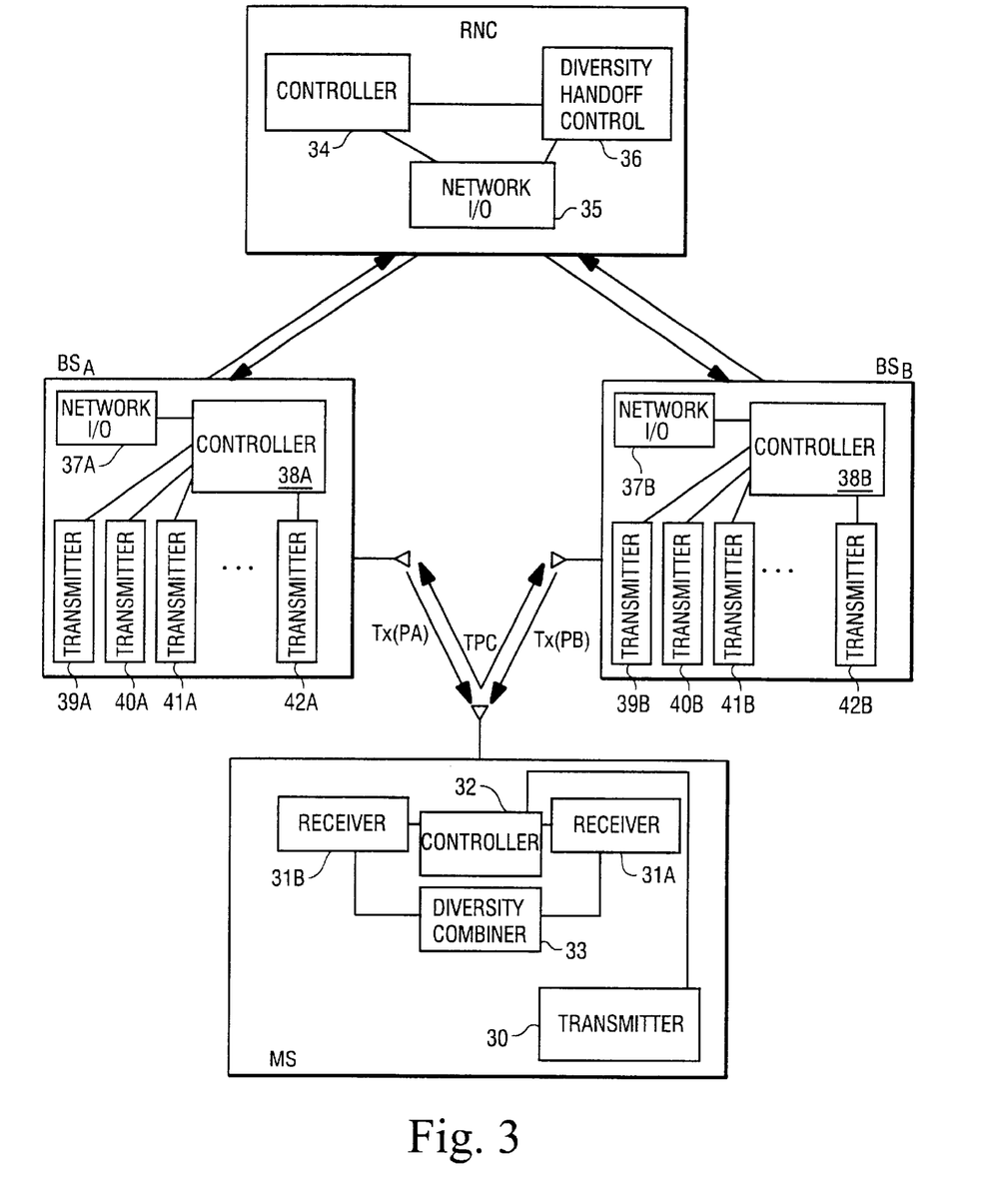
FIG. 3 is simplified schematic view of a cellular system structure into which the present invention may be incorporated.

As described in FIG. 1, a mobile station from time to time must be handed over from one base station to another to optimize communication conditions. In soft handovers, the mobile station is in communication with two base stations at one time, which has benefits known to those of ordinary skill in the art and need not be described in detail herein. In FIG. 3, the mobile station MS includes a transmitter part 30 and two receiver parts 31A and 31B. The receivers 31A and 31B communicate with a controller 32 and a diversity combiner 33, which is used to combine the received transmissions from the base stations BSa and BSb. The base stations each include network I/Os 37A and 37B, which interface the base stations with the radio network controller RNC, via the network I/O 35. Within the base stations, the network I/Os 37A and 37B communicate with controllers 38A and 38B, which communicate with multiple transmitters 39A–42A and 39B–42B. Each base station would further have a receiver part (not shown) for receiving transmissions from the mobile station MS.

As one example embodiment of transmissions between the mobile station and base station, the transmitter of the base stations BSa and BSb are shown transmitting data Tx at power levels PA and PB, respectively. The mobile station MS further responds as appropriate with a transmitter power control signal TPC to the respective base stations BSa and BSb. FIG. 3 is not meant to identify all communication data types between mobile stations, base stations, and radio network cores, but is provided only for illustrative purposes. The base stations BSa and BSb communicate with the radio network or RNC, which includes such further components as the controller 34 and diversity handoff control part 36.

Figure 4:
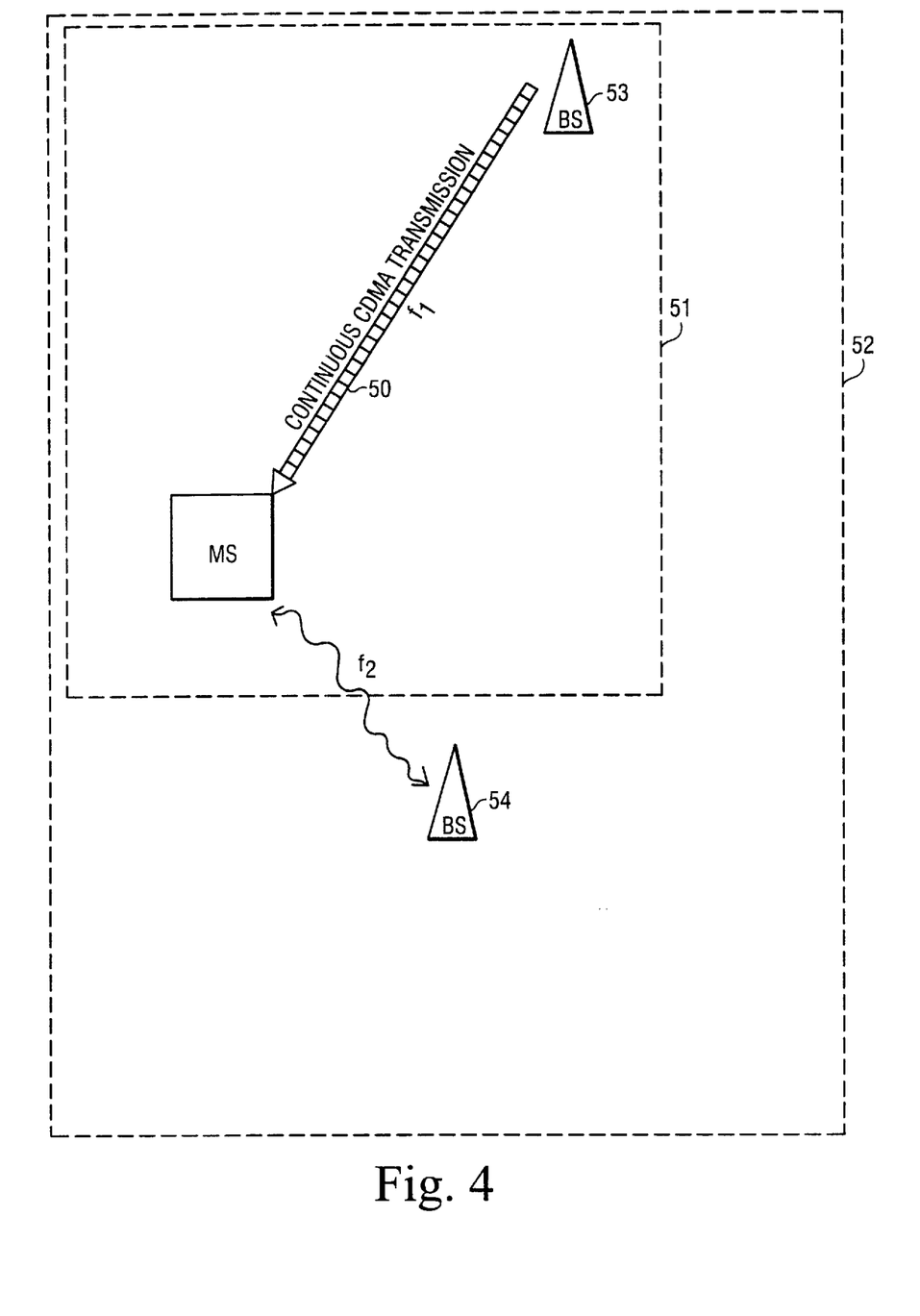
FIG. 4 is a simplified schematic representation of a cellular system in accordance with one example embodiment of the present invention.

As described above, from time to time, a mobile station communicating with a base station in CDMA or WCDMA mode receives a continuous CDMA transmission from the base station at a particular frequency. In hierarchical and other types of systems, the mobile stations may need to take measurements on other frequencies to determine whether a handover (soft, softer, or hard) may be appropriate. In FIG. 4, an hierarchical structure is shown in which geographic area 51 is shown as a local area serviced by base station 53, within a larger geographic area 52 serviced by base station 54. In FIG. 4, the mobile station MS is in continuous CDMA communication with base station 53 and is receiving a continuous CDMA transmission stream of frames at frequency F1. The transmission frames are indicated by element 50 from base station 53 to mobile station MS. In the embodiment of FIG. 4, the CDMA transmission is shown for illustrative purposes on the downlink, but the present invention has application on the uplink and simultaneously on the uplink/downlink as well.

A problem in FIG. 4 arises when the mobile station MS moves to the cell boundary of the area 51 and is instructed to take measurements from base station 54. If the mobile station has a dual receiver mode, it can take the measurements at frequency f2 from base station 54 with its second receiver componentry, (analogous to, for example, FIG. 2).

If, however, the mobile station MS does not have dual receiver (mode) capability, it is in a dilemma. It has been instructed to take measurements on frequency f2, but it is receiving a continuous stream of CDMA transmissions on frequency f1, which is continuously occupying the single receiver resources of the mobile station MS. In such a single mode mobile station, the compressed mode capability shown and described with respect to FIGS. 5 and 6 can be employed.

Figure 5:
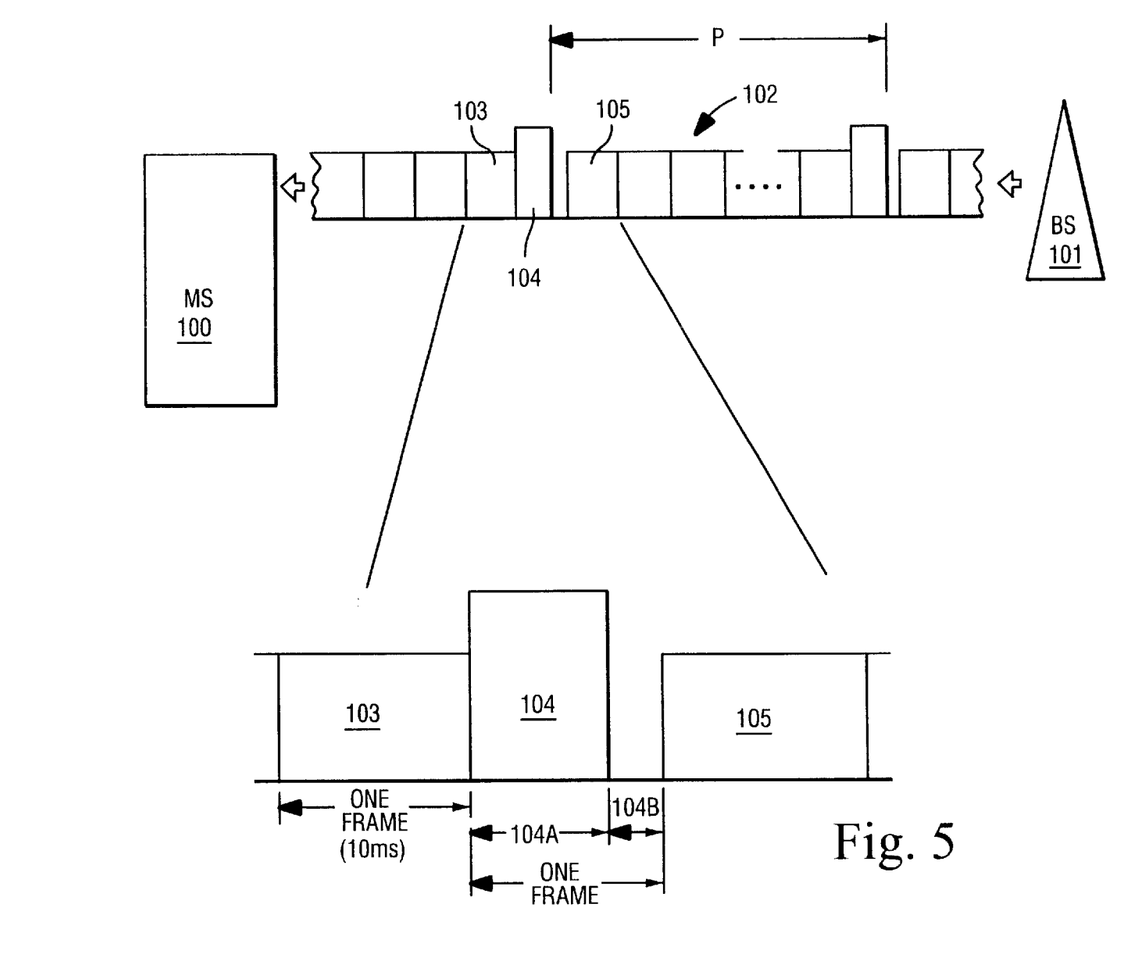
FIG. 5 is a schematic representation of a compressed mode in accordance with an example embodiment of the present invention.

In FIG. 5, the mobile station 100 is receiving the continuous stream of CDMA transmissions from base station 101. The continuous stream of frames 102 is again shown for illustrative purposes on the downlink from base station 101 to mobile station 100. Ordinarily, the mobile station 100 would receive a stream of frames of uniform dimension over time. In the compressed mode, however, the base station 101 compresses the information in slot 104 in order to create a slot of interrupted, spare, space in the otherwise continuous CDMA transmission. Thus, as shown in the enlargement at the bottom of FIG. 5, mobile station 100 receives frame 103, which is one frame length (10 milliseconds in WCDMA) followed by a compressed frame 104 having a frame duration 104A. The remaining time within the "one frame" time allotted for the data in frame 104 is shown as the slot 104B. After the slot, a next frame 105 of typical duration is shown. The base station 101 can provide the slot 104B as a single event to the mobile station 100, or (as shown in FIG. 5), the slots may repeat every period P.

Figure 6:
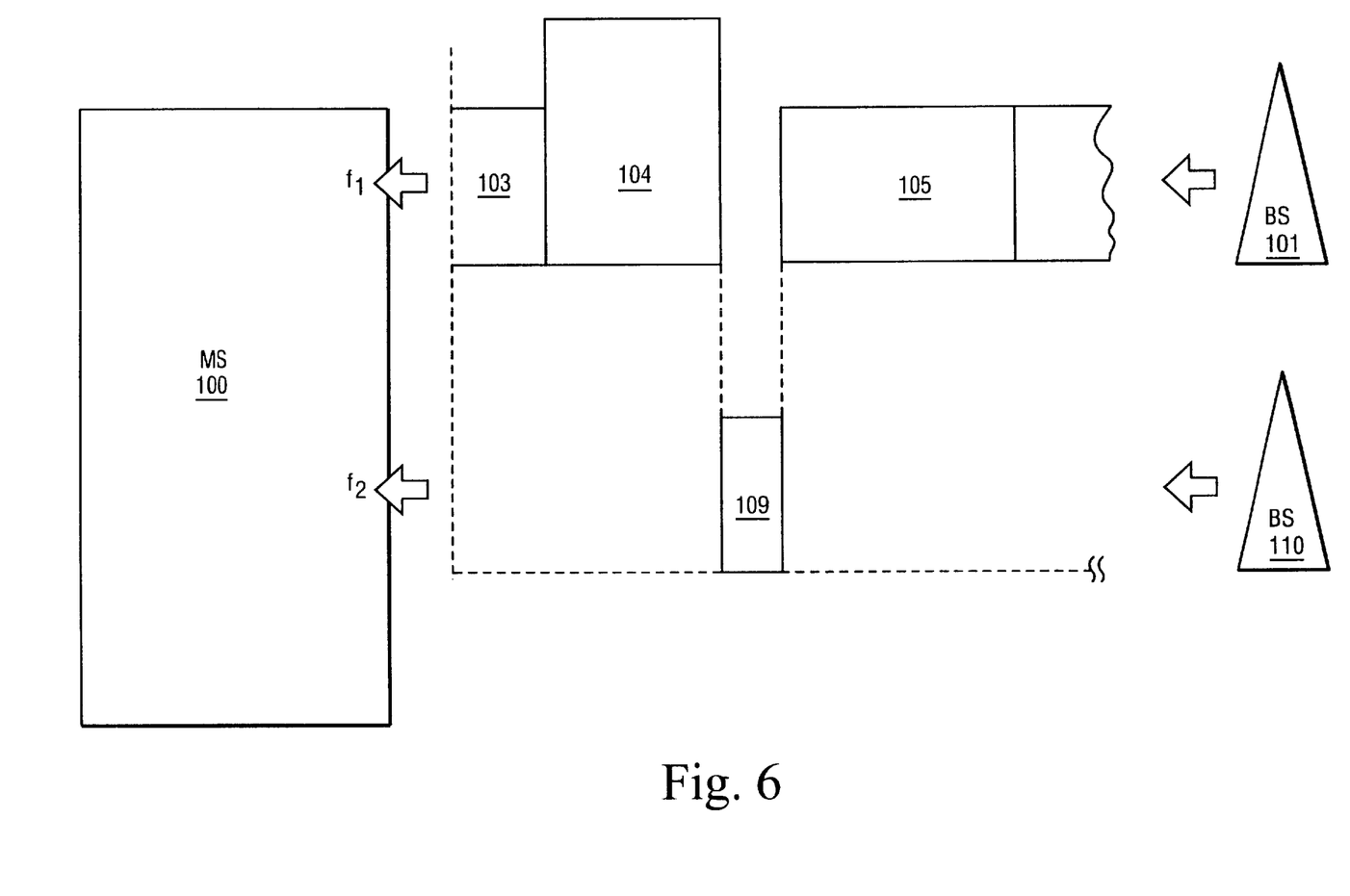
FIG. 6 is a schematic representation of a compressed mode in accordance with an example embodiment of the present invention.

FIG. 6 illustrates what the mobile station 100 does with the slot period 104B. Referring back to FIG. 4, that the mobile station MS, which is receiving the otherwise continuous CDMA transmission 50, requires an interruption to take measurements from the base station 54. In FIG. 6, the interruption for that measurement is identified as the slot that occurs at the junction between 104 and 105. Thus, mobile station 100 receives frame 103 at frequency f1, followed by compressed frame 104 at frequency f1. Immediately thereafter, mobile station 100 switches to frequency f2, to receive a transmission from base station 110 (corresponding to base station 54 in FIG. 4) and takes in information 109 from base station 110 during the slot period between frames 104 and 105. That is, after the information 109 is received from mobile station 100 at frequency f2, the mobile station 100 switches back to frequency f1 and receives frame 105 from base station 101. The mobile station 100 now has the information 109 upon which appropriate measurements can be taken and a handover determination can be made. Meanwhile, the base station 101 continues to provide the mobile station 100 with the CDMA transmission interrupted only by the slots 104B (either as a one time event or as a periodic event).

The problem with prior art systems that employ compressed modes is that the network initiates and controls the creation of the slot in the compressed mode. Since many different varieties of mobile stations are available (starting with single mode and dual mode mobile stations), the type of slot needed by any particular mobile station will depend in large part upon the characteristics of the mobile station. Further, the type of signal being measured by the mobile station from the base station 110 during the slot 109 will also affect the type and duration of the slot needed by the mobile station to make appropriate measurements. In the prior systems, either the network was forced to guess at appropriate slot characteristics or memorize the mobile station characteristics in order to tailor an appropriate slot for the mobile station. The present invention resolves that dilemma.

Figure 7:
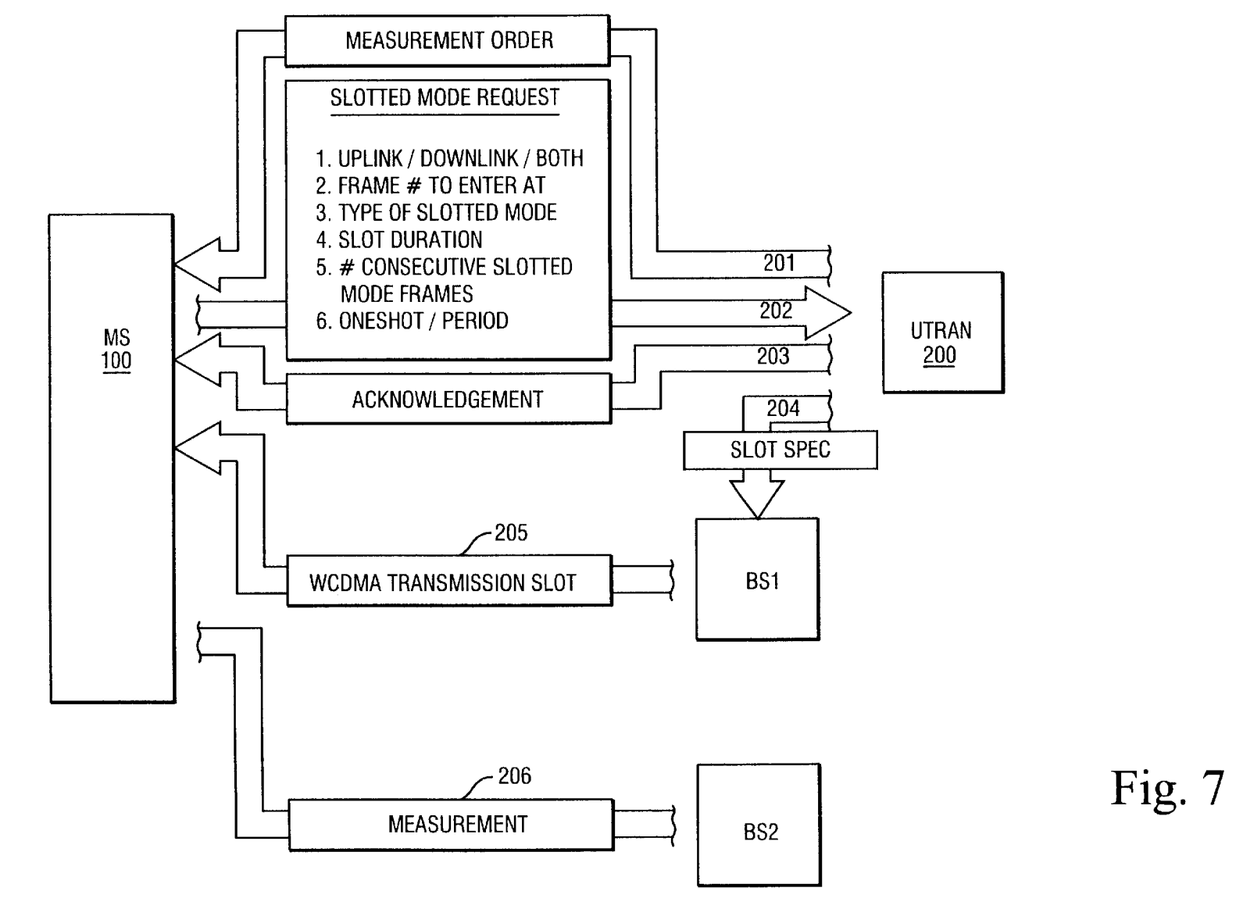
FIG. 7 is schematic timing block diagram of the compressed mode control aspects of an example embodiment of the present invention.

In FIG. 7, mobile station 100 communicates with the network 200 via base stations BS1 and BS2. FIG. 7 may be said to be loosely corresponding to FIG. 6 with base station 106 in FIG. 6 corresponding to base station BS1 in FIG. 7 and base station 110 of FIG. 6 corresponding to base station BS2 in FIG. 7. As shown in FIG. 4, when the mobile station MS, within, for example an hierarchical system, approaches the geographic boundary or area 51 serviced by base station 53, the mobile station MS receives an order to take a measurement from base station 54. As shown in FIG. 7, the measurement order 201 is issued by the network 200 to the mobile station 100. Other alternative embodiments for initiating the measurement can also be employed, including mobile station and base station initiation procedures.

After the mobile station 100 receives the measurement order 201, the mobile station 100 sends a compressed mode request 202 to the network 200. The compressed mode request can include a variety of information, and in the preferred embodiment includes the following:

1. An indication whether the mobile station 100 intends to apply the compressed mode only to an uplink, only to a downlink, or to both the uplink and the downlink;
2. A frame number that the mobile station intends to enter the compressed mode in (recognizing that frames within a dedicated channel are assumed to be numbered);
3. Type characteristics for the compressed mode;
4. The slot duration (for example, measurement slot being in the middle of the frame, at the end of the frame plus at the first part of the next frame, etc.);
5. The number of consecutive frames that compressed mode would be entered in (defaulting to one); and
6. An indication whether the mobile station needs a one shot measurement or a periodic measurement (and if a periodic measurement is desired, the appropriate period).

Some or all of the above-indicators (plus other relevant indicators) may be removed, substituted, replaced, or added as the system characteristics dictate. Plus, all six information types above are not required by the present invention, nor are other information types excluded.

The network 200 receives the compressed mode request and such an acknowledgment 203 to the mobile station 100. At that point, the network 200 recognizes the compressed mode request characteristics needed by the particular mobile station 100 to meet the measurement order 201, and communicates that compressed mode specification 204 to the base station BS1. The base station BS1 then prepares the WCDMA transmission slot 205 in accordance with, for example, the stream 102 of FIG. 5. Once the slot 104B (FIG. 5) occurs, the mobile station 100 takes the opportunity during the spare time to take the measurement 206 (FIG. 7) from base station BS2. The grabbing of that measurement 206 from base station BS2 corresponds with the taking of the measurement 109 from base station 110 in FIG. 6.

By letting the mobile station control the compressed mode, several benefits are achieved. First, the mobile station can control the timing of the slot so that the compressed mode never collides with the mobile stations attention to a page channel for a parallel core network where the mobile station is idle (for example, by having a same type of definition as the sleep-mode cycle for the mobile station. One particular embodiment would be in the form 2"). Second, if the mobile station is a dual mode receiver type mobile station, the compressed mode steps that might otherwise be suggested by a network can be completely eliminated to allow the dual receiver mode mobile station to implement its dual receiver characteristics to take the measurements desired. Third, the mobile station implementations, which differ between different mobile stations need not be memorized or adapted to by the network 200, but can be accommodated by the mobile station in the compressed mode request 202 to provide a slot specification 204 consistent with what the mobile station 100 needs in order to take the measurement 206. Fourth, if compressed mode is necessary for inter system measurements, the UMTS standard need not consider how and when the mobile station must measure the other system (for example, a UMTS-PDC dual receiver mode mobile station will request different compressed mode characteristics and a UMTS-GSM dual receiver mode mobile station—this can apply both to the periodicity of the slot and the length of the measurement slots).

In further aspects of the preferred embodiment of the present invention, the mobile station must be able to change its compressed mode pattern during a CDMA transmission from a current base station. This allows the mobile station, for example, to change the timing but not the periodicity of the slot when, for example, during soft handover, the mobile station enters another cell and the paged channel sleep mode cycle will collide with the current slot pattern.

In further aspects of the preferred embodiment of the present invention, the mobile station can choose based on its own characteristics whether the compressed mode will exist only on a downlink or simultaneously on downlink and uplink. Sometimes, networks have reason to impose compressed mode on the uplink, but continuous compressed mode on the uplink causes EMC problems for the mobile station. In the present invention, however, the mobile station has control of the compressed mode type in the compressed mode request 202 and thus can determine whether use of an uplink compressed mode is beneficial or will cause too much EMC problem to be worth the benefit.

The present invention has the further advantage, in the dual mode terminal, of eliminating a serious complexity situation in the network. In a dual mode terminal, the slots imposed in the WDCMA transmission may need to be synchronized with certain timing aspects of the other (dual receiver mode) system that the mobile station needs to measure on (for example, to decode BSIC in GSM). Organizing that synchronization is complex in the network 200, but simplified in the mobile station.

Even for a WDCMA-only mobile station, the need to monitor two independent channels simultaneously (for example, a dedicated channel and a paging channel, or a FACH for data transmission) is sometimes advantageous. The monitoring of two independent channels is feasible for the WCDMA-only terminal only if both channels use the same frequency and neither uses compressed mode. If, on the other hand, the compressed mode is employed on the dedicated channel to allow inter-frequency measurements, then the parallel channel cannot be received during the slot. This will cause problems if a parallel paging channel is used because the sleep mode on that channel will collide with the compressed mode on the dedicated channel. In accordance with the present invention, the slot is not dictated by the network and therefore the mobile station can coordinate its own characteristics associated with receiving the paging channel to avoid collisions between the paging channel and the slot characteristics.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a cellular communication system wherein a mobile radio communicates with base stations in communication with a radio network, a method comprising:

sustaining a continuous stream of communication between the mobile radio and a first base station at a first frequency;

issuing an order from the network to a mobile radio to measure a signal characteristic from a second base station at a second frequency;

creating at the mobile station a compressed mode request signal including at least one characteristic of a slot in the continuous stream of communication;

communicating the compressed mode request signal from the mobile radio to the network;

acknowledging to mobile radio the compressed mode request signal;

ordering the first base station to create said slot in the continuous stream of communication; and at the mobile station, measuring the signal characteristic from the second base station at the second frequency during the slot.

2. A method according to claim 1, wherein the sustaining step includes sustaining a continuous WCDMA stream.

3. A method according to claim 1, wherein the ordering step includes:

transmitting from the network to the first base station the at least one characteristic of the slot.

4. A method according to claim 1, further including the step of:

reporting the results of the measurement to the network.

5. A method according to claim 1, wherein the at least one characteristic of the slot in the continuous stream of communication includes information identifying whether the slot is to occur in one shot or periodically.

6. A method according to claim 1, wherein the at least one characteristic of the slot in the continuous stream of communication includes information identifying a duration and starting point of the slot.

7. A method according to claim 1, wherein the at least one characteristic of the slot in the continuous stream of communication includes information identifying whether the slot is to occur on uplink, downlink, or both.

8. A method according to claim 1, wherein the at least one characteristic of the slot in the continuous stream of communication includes information identifying a number of consecutive frames for the slot.

9. In a cellular communication system wherein a plurality of mobile radios, some of which are dual receiver mode mobile radios, communicate with base stations in communication with a radio network, a method comprising:

sustaining a continuous stream of communication between a mobile radio and a first base station at a first frequency;

issuing an order from the network to the mobile radio to measure a signal characteristic from a second base station at a second frequency;

determining whether the mobile radio is a dual receiver mode mobile radio;

if the mobile radio is a dual receiver mode mobile radio, measuring the signal characteristic form the second base station while simultaneously receiving the continuous stream of communication from the first base station; and if the mobile radio is not a dual receiver mode mobile radio, creating a compressed mode request signal at the mobile station to include at least one characteristic of a slot in the continuous stream of communication, communicating the compressed mode request signal from the mobile radio, generating a slot in the continuous stream based on the compressed mode request signal, and measuring the signal characteristic from the second base station at the second frequency during the slot.

10. A method as in claim 9, wherein the sustaining step includes sustaining a continuous WCDMA stream.

11. A method as in claim 9, wherein step of communicating the compressed mode request signal from the mobile radio includes communicating to the network.

12. A method as in claim 11, wherein the step of generating the slot includes the steps of:

transmitting from the network to the first base station the at least one characteristic of the slot.

13. A method as in claim 9, further including the step of:

reporting the results of the measurement to the network.

14. A method as in claim 9, wherein the at least one characteristic of the slot in the continuous stream of communication includes information identifying whether the slot is to occur in one shot or periodically.

15. A method as in claim 9, wherein the at least one characteristic of the slot in the continuous stream of communication includes information identifying a duration and starting point of the slot.

16. A method as in claim 9, wherein the at least one characteristic of the slot in the continuous stream of communication includes information identifying whether the slot is to occur on uplink, downlink, or both.

17. A method as in claim 9, wherein the at least one characteristic of the slot in the continuous stream of communication includes information identifying a number of consecutive frames for the slot.

18. A single receiver mode mobile radio, comprising:

a transmitter part to transmit messages to a first base station;

a receiver part to receive a continuous stream of messages from the first base station at a first frequency; and a controller to receive information instructing the mobile radio to measure a signal characteristic from a second base station at a second frequency, and, in response to the control information, to prepare and deliver to the transmitter part a compressed mode request signal including a specification for a slot to occur in the continuous stream, which specification is particularly designed to accommodate operational parameters of the mobile radio transmitter part and receiver part.

19. A single receiver mode mobile radio as in claim 18, wherein the slot specification is designed to accommodate all operational parameters of the mobile radio transmitter part and receiver part.

* * * * *